United States Patent
Kodimer

(10) Patent No.: US 9,881,225 B2
(45) Date of Patent: Jan. 30, 2018

(54) SYSTEM AND METHOD FOR INTELLIGENT RECEIPT PROCESSING

(71) Applicants: Kabushiki Kaisha Toshiba, Minato-ku (JP); Toshiba TEC Kabushiki Kaisha, Shinagawa-ku (JP)

(72) Inventor: Marianne L. Kodimer, Huntington Beach, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/134,069

(22) Filed: Apr. 20, 2016

(65) Prior Publication Data

US 2017/0308767 A1    Oct. 26, 2017

(51) Int. Cl.
*G06K 9/34* (2006.01)
*G06Q 20/20* (2012.01)

(52) U.S. Cl.
CPC .......... *G06K 9/344* (2013.01); *G06Q 20/209* (2013.01)

(58) Field of Classification Search
None
See application file for complete search history.

(56) References Cited

U.S. PATENT DOCUMENTS

| | | | | |
|---|---|---|---|---|
| 6,314,426 B1 * | 11/2001 | Martin | ............ | G05G 9/047 |
| 6,917,438 B1 * | 7/2005 | Yoda | ............ | G06F 17/30011 |
| | | | | 358/1.15 |
| 7,312,766 B1 * | 12/2007 | Edwards | ............ | G02B 27/017 |
| | | | | 248/115 |
| 7,415,431 B2 * | 8/2008 | Pintsov | ............ | G06Q 20/04 |
| | | | | 705/32 |
| 7,596,755 B2 * | 9/2009 | Graham | ............ | G06F 17/30017 |
| | | | | 715/723 |
| 7,605,801 B1 * | 10/2009 | Sharp | ............ | G06F 3/0338 |
| | | | | 345/156 |
| 7,631,275 B2 * | 12/2009 | Chicles | ............ | H04N 5/44543 |
| | | | | 715/768 |
| 7,792,709 B1 * | 9/2010 | Trandal | ............ | G06Q 30/02 |
| | | | | 705/26.1 |
| 7,840,092 B2 * | 11/2010 | Sato | ............ | G06F 17/211 |
| | | | | 382/209 |
| 8,243,983 B2 * | 8/2012 | Lam | ............ | G06K 19/06009 |
| | | | | 235/462.1 |
| 8,285,604 B1 * | 10/2012 | Trandal | ............ | G06Q 30/02 |
| | | | | 705/26.7 |
| 8,468,064 B1 * | 6/2013 | Trandal | ............ | G06Q 30/02 |
| | | | | 705/26.7 |

(Continued)

*Primary Examiner* — Feng Niu
(74) *Attorney, Agent, or Firm* — Ulmer & Berne LLP

(57) ABSTRACT

A system and method for document management, such as receipts, includes a device having a processor and associated memory, a wireless data interface and a digital imager. The device is configured to selectively generate image data corresponding to captured images of associated receipts acting in connection with a touchscreen display. Price data is extracted from multiple areas of the image data and an image of the receipts on the touchscreen display is generated. The processor determines a position of the price data on the image and highlights at least one user-selectable portion of the image on the touchscreen display. Aggregate costs are calculated and displayed in accordance with user selection.

20 Claims, 6 Drawing Sheets

(56) References Cited

U.S. PATENT DOCUMENTS

| | | | | |
|---|---|---|---|---|
| 8,509,536 B2* | 8/2013 | Hwang | | G06K 9/00463 |
| | | | | 382/176 |
| 8,625,899 B2* | 1/2014 | Kim | | G06F 17/2863 |
| | | | | 382/185 |
| 8,739,040 B2* | 5/2014 | Graham | | G06F 17/30017 |
| | | | | 715/723 |
| 8,756,422 B2* | 6/2014 | Pizano | | H04L 51/12 |
| | | | | 713/170 |
| 8,793,574 B2* | 7/2014 | Curtis | | G06F 17/243 |
| | | | | 715/221 |
| 8,995,767 B2* | 3/2015 | Graham | | G06F 17/30017 |
| | | | | 382/173 |
| 9,035,888 B1* | 5/2015 | Delatorre | | G06F 3/04886 |
| | | | | 345/173 |
| 9,134,215 B1* | 9/2015 | Vignisson | | G06N 5/04 |
| 9,170,680 B2* | 10/2015 | Zay | | G06F 3/0418 |
| 9,389,718 B1* | 7/2016 | Letourneur | | G06F 3/0412 |
| 9,505,554 B1* | 11/2016 | Kong | | H04N 5/23212 |
| 9,569,420 B2* | 2/2017 | Hoshino | | G06F 17/2735 |
| 2002/0138265 A1* | 9/2002 | Stevens | | G10L 15/22 |
| | | | | 704/251 |
| 2003/0041006 A1* | 2/2003 | Bunda | | G06Q 40/04 |
| | | | | 705/37 |
| 2004/0083134 A1* | 4/2004 | Spero | | G06Q 20/20 |
| | | | | 705/16 |
| 2004/0184678 A1* | 9/2004 | Maddison | | G02B 21/002 |
| | | | | 382/291 |
| 2006/0023248 A1* | 2/2006 | Reese | | G06Q 20/24 |
| | | | | 358/1.15 |
| 2006/0150103 A1* | 7/2006 | Chicles | | H04N 5/44543 |
| | | | | 715/725 |
| 2006/0218088 A1* | 9/2006 | Flora | | G06Q 10/10 |
| | | | | 705/39 |
| 2007/0091373 A1* | 4/2007 | Sato | | G06F 17/211 |
| | | | | 358/1.18 |
| 2008/0055405 A1* | 3/2008 | Maddison | | G02B 21/002 |
| | | | | 348/79 |
| 2008/0133281 A1* | 6/2008 | Bolt | | G06Q 10/02 |
| | | | | 705/5 |
| 2010/0008582 A1* | 1/2010 | Kim | | G06F 17/2863 |
| | | | | 382/177 |
| 2010/0027050 A1* | 2/2010 | Regnier | | H04N 1/00204 |
| | | | | 358/1.15 |
| 2010/0306080 A1* | 12/2010 | Trandal | | G06Q 10/10 |
| | | | | 705/26.8 |
| 2010/0331043 A1* | 12/2010 | Chapman | | G01C 21/20 |
| | | | | 455/556.1 |
| 2011/0123114 A1* | 5/2011 | Hwang | | G06K 9/00463 |
| | | | | 382/176 |
| 2012/0023398 A1* | 1/2012 | Hoshino | | G06F 17/2755 |
| | | | | 715/256 |
| 2012/0089946 A1* | 4/2012 | Fukui | | G08C 17/00 |
| | | | | 715/822 |
| 2013/0159081 A1* | 6/2013 | Shastry | | G06Q 30/0274 |
| | | | | 705/14.23 |
| 2014/0067631 A1* | 3/2014 | Dhuse | | G06Q 40/10 |
| | | | | 705/30 |
| 2014/0095985 A1* | 4/2014 | Argue | | G06Q 20/0453 |
| | | | | 715/243 |
| 2015/0095133 A1* | 4/2015 | Parker | | G06Q 20/202 |
| | | | | 705/14.38 |
| 2015/0095134 A1* | 4/2015 | Parker | | G06Q 20/202 |
| | | | | 705/14.38 |
| 2015/0234570 A1* | 8/2015 | Hampson | | G06Q 50/01 |
| | | | | 715/753 |
| 2016/0012465 A1* | 1/2016 | Sharp | | G06Q 20/18 |
| | | | | 705/14.17 |
| 2016/0217112 A1* | 7/2016 | Carter | | G06F 3/04842 |
| 2016/0344860 A1* | 11/2016 | Chapman | | G01C 21/20 |
| 2017/0091760 A1* | 3/2017 | Baumwald | | G06Q 20/381 |

* cited by examiner

SYSTEM AND METHOD FOR INTELLIGENT RECEIPT PROCESSING

TECHNICAL FIELD

This application relates generally to a system and method for capturing and editing images. The application relates more specifically to capturing and editing of receipts for generating, communicating and storing of expense information.

BACKGROUND

Many commercial transactions are documented by paper receipts. Receipts may be in the form of itemized billing, such as from a restaurant or a hotel. Other receipts may be related to a single purchase, such as a plane ticket or taxi fare. Still other receipts may include multiple types of expenses, such as a hotel receipt which also reflects restaurant or room service charges, or a department store receipt which includes items such as food, clothing and pharmaceuticals. Receipts may include additional charges, such as taxes, gratuities, service fees, fuel surcharges, and the like. Earliest receipts were hand written at the time of a transaction. More recently, receipts are printed by a point-of-sale device, such as at a cash register or following a credit card swipe.

Receipts are important for many reasons, including documenting a purchase for a possible return or exchange of merchandise. Receipts are frequently necessary for business expenses to facilitate reimbursement or to sustain a tax deduction. Receipts may contain different entries that require different treatment. For example, some items may be legitimate for reimbursement or for tax deduction, while others in the same receipt or related receipts are not. Some items may be reimbursable, but with different rules than for others on the same receipt. Distinctions may be based on areas such as company policy or tax regulations.

It can be difficult and time consuming to maintain paper receipts, particularly when a lot of receipts are generated such as might be encountered during long or frequent business trips. Receipts can be lost or damaged. Archiving paper receipts for months or years, particularly for large enterprises, can require substantial storage space. Also, paper receipts can fade over time. Receipts printed with thermal paper may become useless if stored in a location with too high a temperature.

Some businesses rely on document processing devices to generate electronic images of paper receipts. These devices include printers, copiers and scanners. More recently, devices employing two or more of these functions are found in office environments. These devices are referred to as multifunction peripherals (MFPs) or multifunction devices (MFDs). MFPs are used in connection with example embodiments disclosed in detail below, but it is to be appreciated that any suitable document processing device can be used. Given the expense in obtaining and maintain MFPs, devices are frequently shared among users via a data network.

SUMMARY

In accordance with an example embodiment of the subject application, a system and method for document management, such as receipts, includes a device having a processor and associated memory, a wireless data interface and a digital imager. The device is configured to selectively generate image data corresponding to captured images of associated receipts acting in connection with a touchscreen display. Price data is extracted from multiple areas of the image data and an image of the receipts on the display is generated. The processor determines a position of the price data on the image and highlights at least one user-selectable portion of the image on the display. Aggregate costs are calculated and displayed in accordance with user selection.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Figure 1:
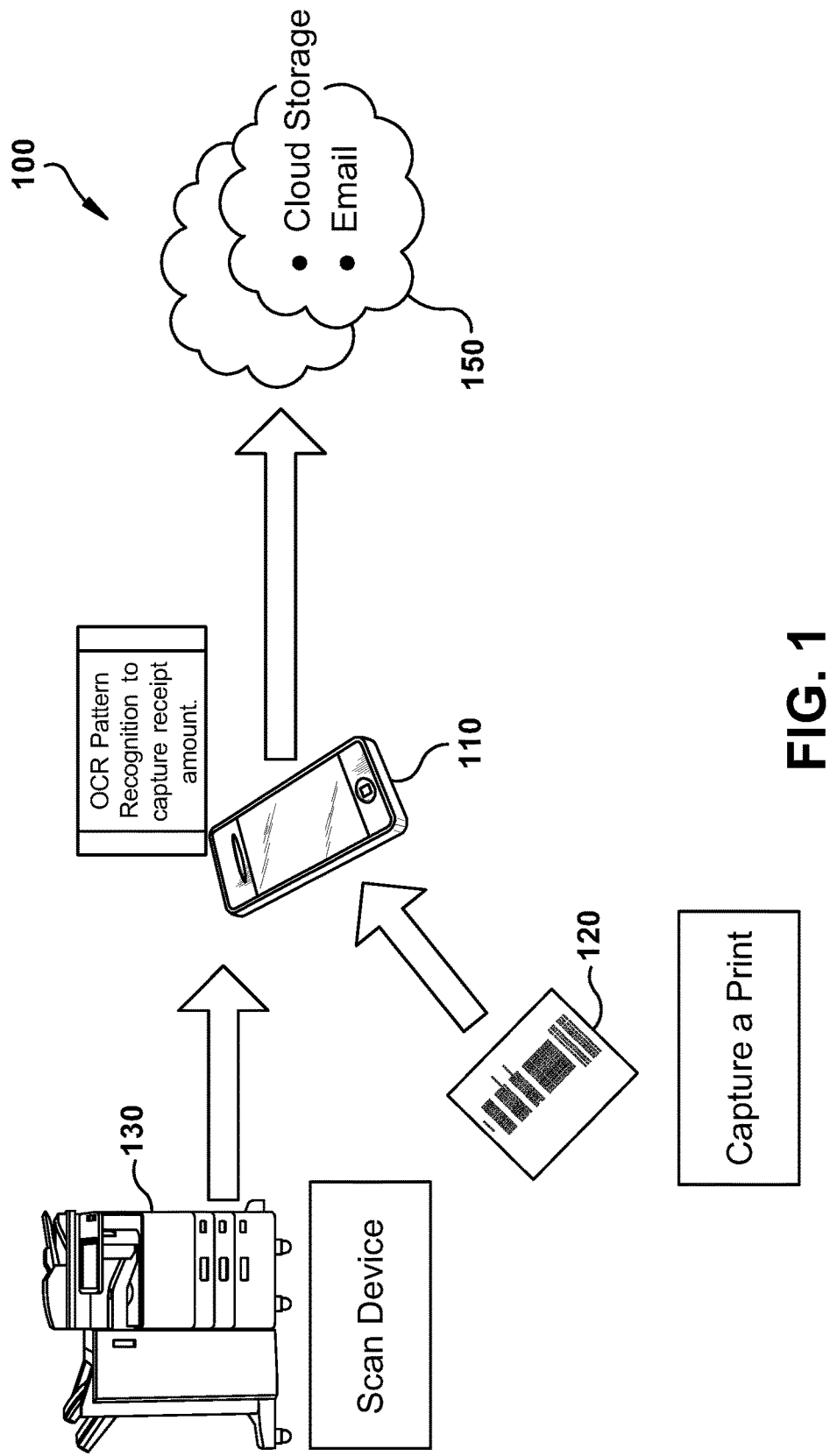
FIG. 1 an example embodiment of a receipt management system.

In accordance with the subject application, FIG. 1 illustrates an example embodiment of a receipt management system 100. A portable data device is suitably comprised of a portable computer, such a tablet, notebook or smartphone. In the illustrated example, such a portable data device is comprised of smartphone 110 which suitably includes a processor, memory, data interface, display, camera and a user interface as will be detailed below. Receipts, such as paper receipts 120 are suitably imaged by use of the camera and electronic image data generated therefrom. Image data is also suitably obtained by other devices in data communication via a wired or wireless network interface, or via a point-to-point data exchange, such as via Bluetooth, near-field communication or optical connection. In the illustrated example, image data is also suitably received from MFP 130, suitably used to scan receipts or as storage for receipt data. Receipt data is also suitably stored or transmitted to shared data storage, such as cloud storage 150. Data is suitably stored directly from a device or may be e-mailed between devices. Networked data communication is suitably accomplished via a local-area network (LAN), a wide-area network (WAN), the global Internet, or any combination thereof. Any suitably image capture system and image data format can be used. By way of example, data formats include JPEG, GIF, TIFF, PDF or DOCx formats. Data is suitably encrypted for security or compressed to save storage space or communication bandwidth.

In the example embodiment of FIG. 1, a user may scan receipts by taking a picture with their smartphone 110 or by scanning on an MFP 130. Resultant data may be stored directly on the smartphone itself or in whole or in part on a networked device such as MFP 130 or cloud storage 150. Image capture and receipt management in connection with the illustrated example will be further detailed further below.

Figure 2:
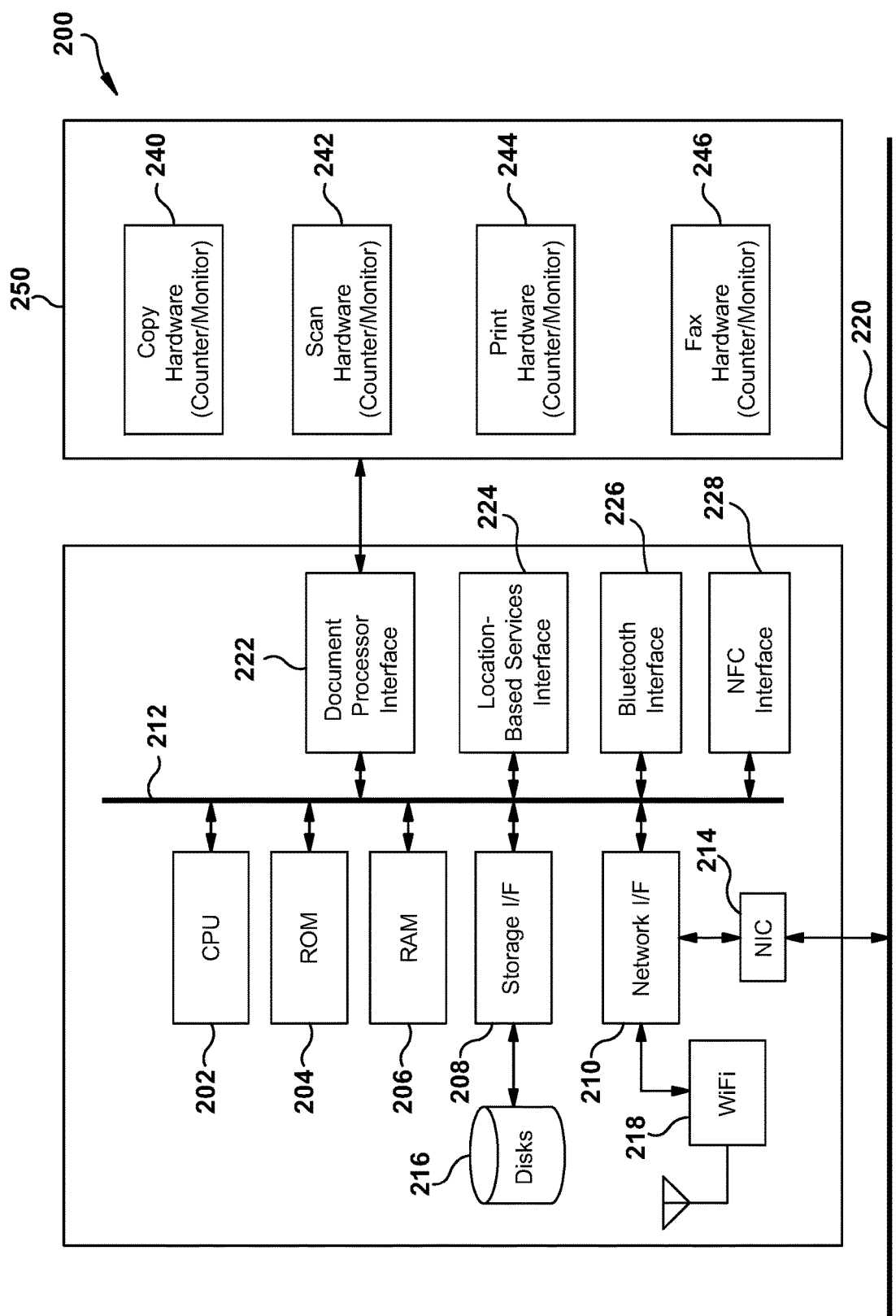
FIG. 2 is an example embodiment of a document processing device.

Turning now to FIG. 2, illustrated is an example of a document rendering system 200 suitably comprised within an MFP, such as MFP 130. Included are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection, or to a wireless data connection via wireless network interface 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. NIC 214 and wireless network interface 218 suitably provide for connection to an associated network 220. Processor 202 can also be in data communication with BLUETOOTH interface 226, and NFC interface 228, either directly as shown or through network interface 218 (not shown.)

Processor 202 can also be in data communication with any suitable user input/output (I/O) interface which provides data communication with user peripherals, such as displays, keyboards, mice, track balls, touch screens, or the like. Also in data communication with data bus 212 is a document processor interface 222 suitable for data communication with MFP functional units. In the illustrate example, these units include copy hardware 224, scan hardware 226, print hardware 228 and fax hardware 230 which together comprise MFP functional hardware 250. It will be understood that functional units are suitably comprised of intelligent units, including any suitable hardware or software platform.

Figure 3:
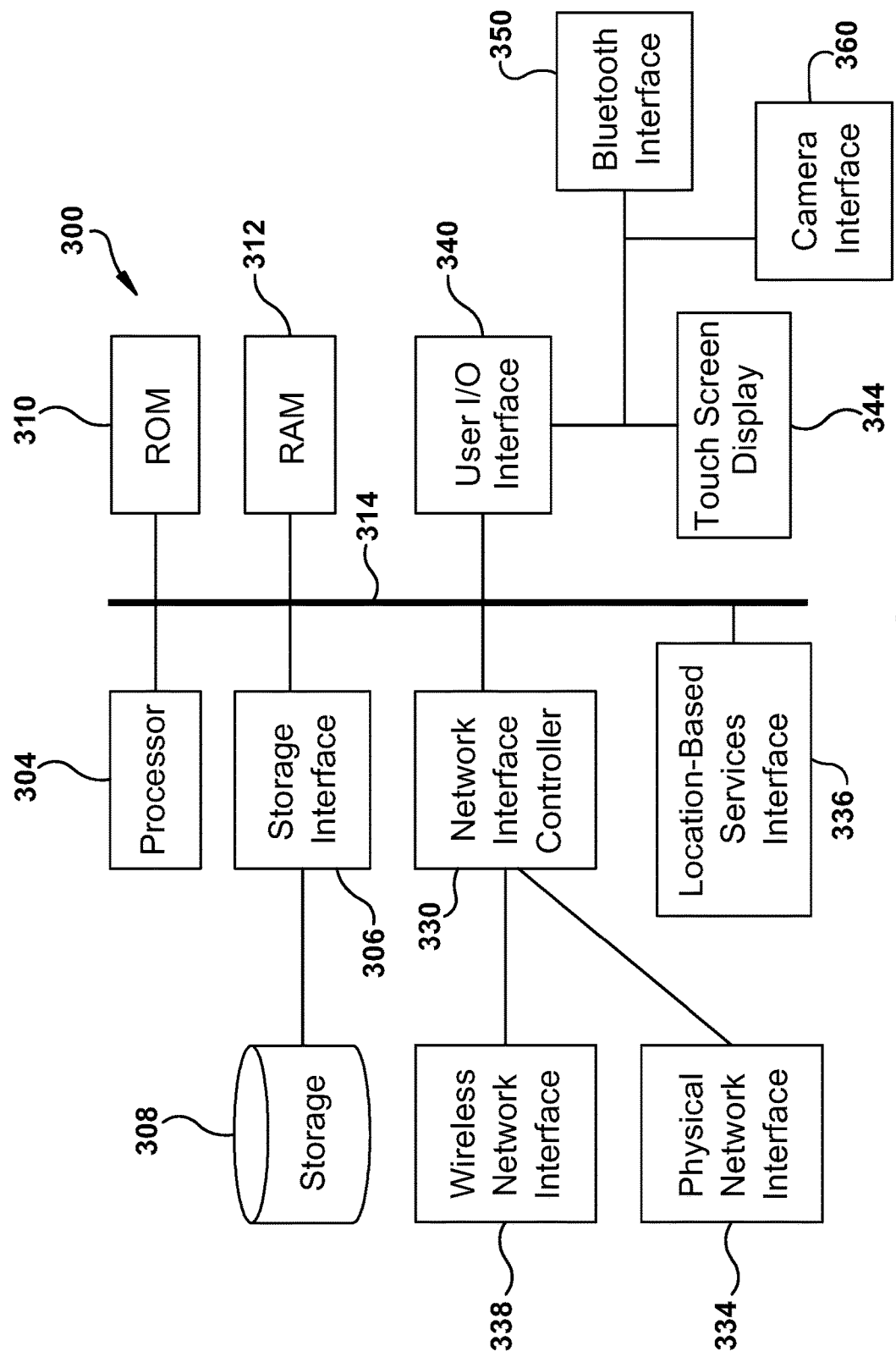
FIG. 3 is an example embodiment of a portable data device.

Turning now to FIG. 3, illustrated is an example of a digital device system 300 suitably comprising a portable data device such as a tablet computer, notebook computer or smartphone such as smartphone 110. Included are one or more processors, such as that illustrated by processor 304. Each processor is suitably associated with non-volatile memory, such as ROM 310, and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338. Example wireless connections include cellular, Wi-Fi, Bluetooth, NFC, wireless universal serial bus (wireless USB), satellite, and the like. Example wired interfaces include Ethernet, USB, IEEE 1394 (FireWire), telephone line, or the like. Processor 304 is also in communication with LBS services interface 336 for location based services.

Processor 304 is also in data communication with a user input/output (I/O) interface 340 which provides data communication with user peripherals, such as display 344, as well as keyboards, mice, track balls, touch screens, or the like. I/O interface 340 suitably communicates with Bluetooth interface 350 and digital camera interface 360. It will be understood that functional units are suitably comprised of intelligent units, including any suitable hardware or software platform.

Figure 4:
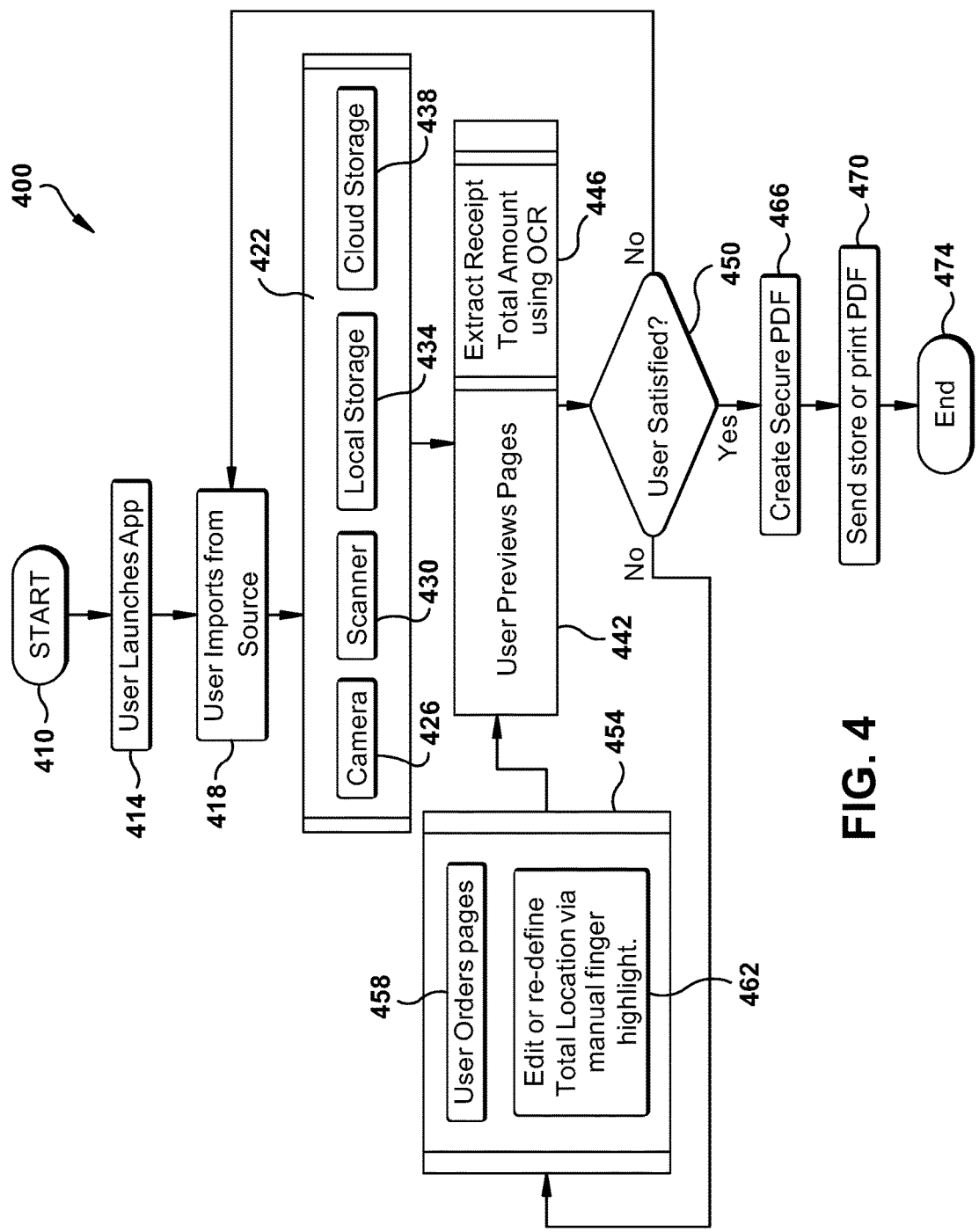
FIG. 4 is an example embodiment of a flowchart for a receipt management system.

Turning now to FIG. 4, illustrated is an example embodiment of a flowchart 400 for a receipt management system in connection with operation of a data device such as smartphone 110 of FIG. 1. The process suitably commences at block 410 and proceeds to block 414 when a user commences a receipt management operation by launching an application on their device, such as a smartphone app. Next, at block 418, receipt data is obtained imported by one or more sources 422. Such sources may include camera 426, scanner 430, local storage 434 or cloud storage 438. Receipt data, such as image data, is suitably used to generate a visible image rendering of the associated receipt or receipts at block 442, which operation suitably includes extraction of information, such as pricing information, item identification, cost type, and the like reflected in a receipt, at block 446. Such extraction is suitably accomplished by any suitable data mechanism, such as optical character recognition (OCR) or pattern recognition. Information relative to receipt content may also be available in barcodes, RFID information, and the like. The extracted pricing information is advantageously captured in conjunction with position data that associates a position of the pricing information relative to the rest of the image or images. Also, pricing information is suitably aggregated, such as by generating one or more totals or subtotals. A database of items is suitably used in conjunction with extraction to facilitate itemization or grouping of items.

By way of particular example, optical character recognition may return an entry for one or more known food items or beverages. Multiple entries are then suitably aggregated for food cost and similarly aggregated for beverage costs. Aggregations of additional items, such as taxes or tips, are also suitably made. Data associated with aggregated costs is then generated for display, along with a receipt image wherein areas associated with purchases and which factor into a report are highlighted. A determination is made at block 450 if the user is satisfied with the current receipt processing. If not, progress is made to block 454 wherein the user suitably places in order multiple pages or entries of receipts at block 458 and selects one or more of the highlighted areas for inclusion, exclusion, cataloging or bundling at block 462. An updated display is then generated at block 442, and this process is repeated until the user is satisfied at block 450. At this point, a final rendering is completed and suitably created as a secure PDF at block 466. This electronic document is then stored locally, shared or placed in on networked storage at block 470, and the process suitably completes at block 474.

In an embodiment, the receipt image data or processed electronic document can be integrated with email or messaging services. For example, a user can use email or send pictures of receipt data for automated expense report processing. In another example, multiple users can send email or messages with receipt data for a common project, allowing project expenses to be treated both individually for reimbursement purposes and together for budgeting or expensing purposes.

In an embodiment, users can edit receipt data to allocate, or pro-rate, the expenses to various categories. Categories can include, but are not limited to personal expenses, reimbursable expenses, non-chargeable expenses, expenses allocated to one or multiple projects, expenses identified with one or more customers, expenses allocated to or identified with another user, unreimbursed work-related expenses that may be tax deductible to the user, and so forth. Categories can also be based on IRS categories such as food and beverages, entertainment, automobile or transportation expenses, lodging, and so forth.

In an embodiment, the receipt data stored in network storage can be further processed. For example, the receipt data can be integrated and compared with credit card statements, which also can be downloaded and scanned. In this example, submitted expenses can be compared and correlated with bills which can assist accounting departments with tracking expenses, allocating expenses internally, authenticating expenses, and paying bills, among other suitable purposes. The data from the receipt processing can be further processed based on the categories, for example to determine expenses and generate reports or bills. In an embodiment, the receipt data can be integrated with individual budgets, for example for reimbursing actual user expenses, determining suitable per diem reimbursement, determining applicable time periods for projects, and for other suitable purposes.

Figure 5:
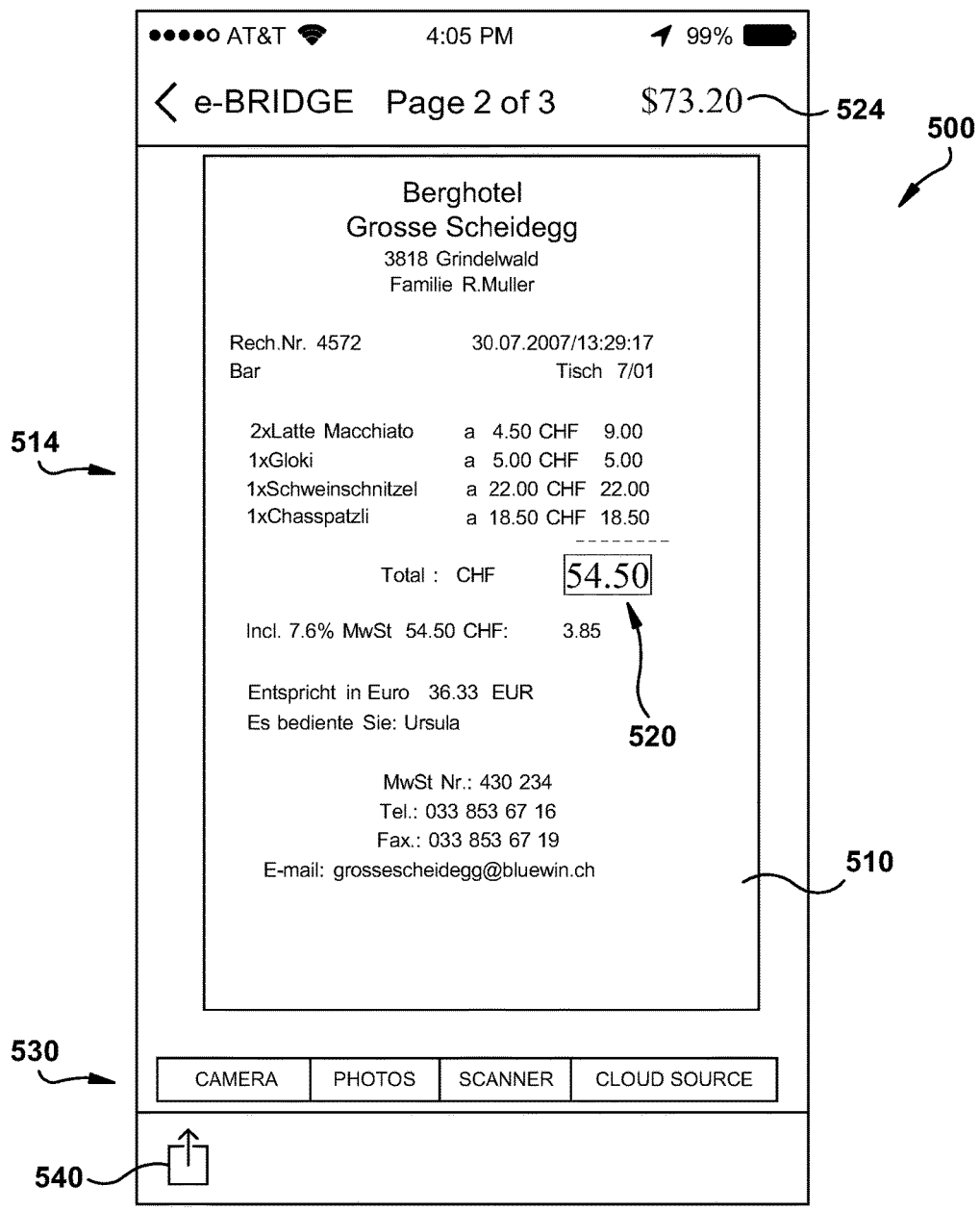
FIG. 5 is an example embodiment of a user interface.

Turning now to FIG. 5, illustrated is an example embodiment of a user interface including a smartphone display image 500 showing an image of a receipt 510. In the example receipt from Switzerland, receipt itemized costs are illustrated at 514 and a total of 54.50 Swiss Francs. The total is captured and converted to dollars with the calculated, converted total of $77.05 displayed at 524. Conversion is suitably rounded or made in connection with stored data or real-time conversion data received via a network. Receipt data is suitably captured directly by the smartphone, or selected from other areas by selection of touch-screen buttons 530. In the example, a user can obtain data from the smartphone camera, from photo data, from a local or remote scanner or from networked storage, such as cloud storage. User selectable button 540 allows for a user to communicate data to share, or for storage.

Figure 6:
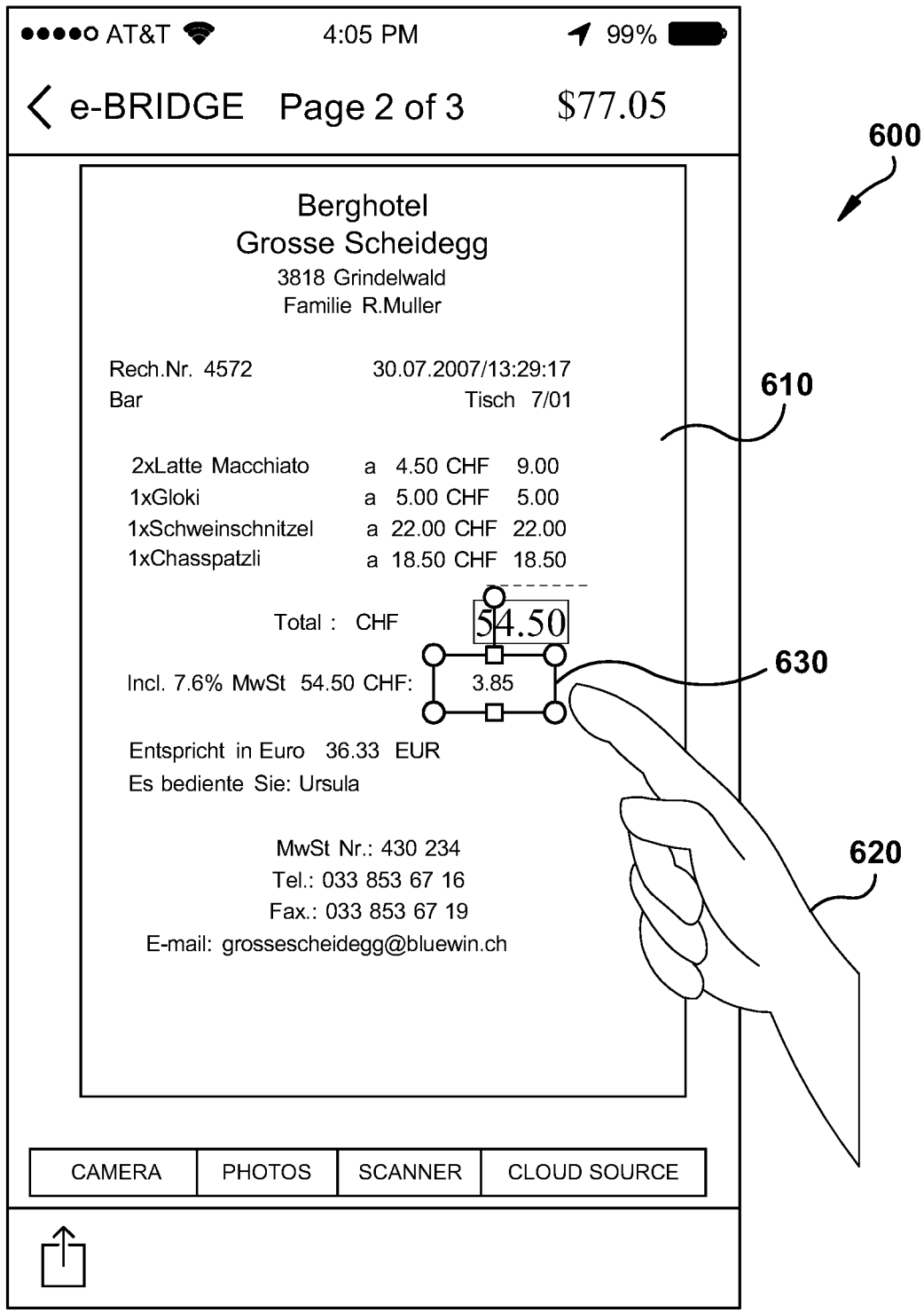
FIG. 6 is another example embodiment of a user interface.

FIG. 6 illustrates an example embodiment of a smartphone display 600 which includes a rendering 610 of the same receipt used in connection with FIG. 5, above. In the illustrated example, the user 620 suitably selects on or more areas, such as price area 630. Area 630 may be isolated and displayed in connection with OCR or other extraction as noted above automatically, or by user area selection. In the example, area 630 comprises included taxes that form part of the total. Selection and itemization may be desirable if such taxes are ultimately deductible or reimbursable, or otherwise ripe for separate handling.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   a wireless data interface;
   a digital imager configured to selectively generate image data corresponding to captured images of a plurality of associated receipts;
   a touchscreen display; and
   a processor and associated memory,
   the processor configured to extract price data from multiple areas of the image data,
   the processor configured to generate an image of each of the plurality of receipts on the touchscreen display,
   the processor configured to calculate position data corresponding to a position of the price data on the image,
   the processor configured to generate at least one highlighted portion of the image on the touchscreen display in accordance with the position data, and
   the processor configured to calculate aggregate price data corresponding to a sum of the price data,
   wherein the touchscreen display is further configured to receive selection data corresponding to at least one highlighted portion selected by an associated user;
   wherein the processor is further configured to update the price data in accordance with received selection data; and
   wherein the touchscreen display is further configured to display the updated price data.

2. The system of claim 1 wherein the digital imager is comprised of a camera.

3. The system of claim 1 wherein the digital imager is comprised of a scanner.

4. The system of claim 1 wherein the wireless data interface is configured to receive image data from an associated networked data storage.

5. The system of claim 1 wherein the wireless data interface is configured to receive image data from an associated document processing device.

6. The system of claim 5 wherein the processor is further configured to extract price data from multiple areas of the image data from each of a plurality of images.

7. The system of claim 6 wherein the image data is comprised of image data from the digital imager and image data received by the wireless data interface.

8. A method comprising:
   selectively capturing image data corresponding to images of associated receipts;
   displaying an image corresponding to the image data on a touchscreen display;
   extracting price data from multiple areas of the image data;
   calculating, via a processor and associated memory, position data corresponding to a position of the price data on the image;
   generating at least one highlighted portion of the image on the touchscreen display in accordance with the position data;
   calculating aggregate price data corresponding to a sum of the price data;
   receiving, via the touchscreen display, selection data corresponding to at least one highlighted portion selected by an associated user;

updating the price data in accordance with received selection data; and displaying the updated price data on the touchscreen display.

9. The method of claim 8 further comprising capturing the image data via a digital camera.

10. The method of claim 8 further comprising capturing the image data via a scanner.

11. The method of claim 8 further comprising receiving image data from an associated networked data storage.

12. The method of claim 8 further comprising receiving image data from an associated document processing device.

13. The method of claim 12 further comprising extracting price data from multiple areas of the image data from each of a plurality of images.

14. The method of claim 13 further comprising receiving the image data from the digital imager and the wireless data interface.

15. A system comprising:
   a digital camera configured to generate image data from captured receipt images;
   a scanner configured to generate image data from captured receipt images;
   a wireless data interface;
   a touchscreen display; and
   a processor and associated memory,
      the processor configured to generate receipt images on the touchscreen display in accordance with the image data;
      the processor configured to extract price data from multiple areas of the receipts from the image data;
      the processor configured to calculate position data corresponding to a position of the price data on the receipts;
      the processor configured to highlight at least one portion of the image of the receipts on the touchscreen display in accordance with the position data;
      the processor configured to calculate aggregate price data corresponding to a sum of the price data,
   wherein the touchscreen display is configured to receive selection data corresponding to at least one highlighted portion selected by an associated user,
   wherein the processor is further configured to update the price data in accordance with received selection data, and
   wherein the touchscreen display is further configured to display the updated price data.

16. The system of claim 15 further comprising a multifunction peripheral including the scanner.

17. The system of claim 16 further comprising a portable data device comprising the touchscreen display and the camera, the portable data device in data communication with the multifunction peripheral via the wireless data interface.

18. The system of claim 17 wherein the processor is further configured to extract the price data via optical character recognition.

19. The system of claim 18 wherein the wireless data interface is further configured to receive image data from cloud-based data storage.

20. The system of claim 19 wherein the processor is further configured to generate composite receipt image data from the image data in accordance with the selection data.

* * * * *